United States Patent [19]
Pykälistö

[11] Patent Number: 6,016,337
[45] Date of Patent: Jan. 18, 2000

[54] TELEVOTING IN AN INTELLIGENT NETWORK

[75] Inventor: Mika Pykälistö, Helsinki, Finland

[73] Assignee: Nokia Telecommunications OY, Espoo, Finland

[21] Appl. No.: 08/945,015

[22] PCT Filed: Apr. 12, 1996

[86] PCT No.: PCT/FI96/00202

§ 371 Date: Oct. 10, 1997

§ 102(e) Date: Oct. 10, 1997

[87] PCT Pub. No.: WO96/32819

PCT Pub. Date: Oct. 17, 1996

[30] Foreign Application Priority Data

Apr. 13, 1995 [FI] Finland ..................................... 951802

[51] Int. Cl.[7] .................................................. H04M 11/00
[52] U.S. Cl. ....................................... 379/92.02; 379/207
[58] Field of Search .............................. 379/92.02, 92.01, 379/92.03, 112, 113, 133, 134, 207, 229, 230

[56] References Cited

U.S. PATENT DOCUMENTS

| | | | |
|---|---|---|---|
| 4,962,525 | 10/1990 | Beekh | 379/92.02 |
| 5,450,483 | 9/1995 | Williams | 379/112 |
| 5,479,492 | 12/1995 | Hofstee et al. | 379/92.02 |

FOREIGN PATENT DOCUMENTS 339 469  11/1989  European Pat. Off. .

OTHER PUBLICATIONS

Funkschau, Volume, No. 17, 1991, Konrad Kornblum, "auf dem weg zum intelligenten dienst", p. 50–p. 53, see p. 52, col. 3 —p. 53.

"Intelligent Network (IN); Intelligent Network Capability Set 1 (CS1) Core Intelligent Network Application Protocol (INAP) Part 1: Protocol specification", European Telecommunication Standard, Jul. 1994, pr ETS 300 374–1, Source: ETSI TC–SPS, Reference: DE/SPS–03015, UDC: 621.395, pp. 2–213.

Melbourne 1988, "Introduction of CCITT Signalling System No. 7, Specifications of Signalling System No. 7", International Telecommunication Union, Mar. 1993, Q.700, ITU–T Recommendation Q.700, pp. i–19.

Advanced Intelligent Network, Release 1 Network and Operations Plan, Jun. 1990, Issue 1, SR–NPL–001623, pp. v–C29.

*Primary Examiner*—Stella Woo
*Attorney, Agent, or Firm*—IP Group of Pillsbury Madison & Sutro LLP

[57] ABSTRACT

The invention relates to a method and arrangement for televoting in an intelligent network. In the method, (a) a point (SCP) comprising a service control function SCF sends a televoting activation request to a point (SSP) comprising a service switching function SSF; (b) the point comprising the service switching function SSF counts the calls made by the users of the telephone network to predetermined telephone numbers; and(c) information on the number of calls is forwarded to the service control function SCF of the intelligent network. In order that faultless televoting in a multi-SCP environment could be guaranteed, the point comprising the service switching function SSF makes comparisons, upon receiving a televoting activation request, to find out whether a televoting process activated by some other service control point and using the same or some of the same telephone numbers is in progress, and if so, the point comprising the service switching function SSF does not start a televoting process.

6 Claims, 5 Drawing Sheets

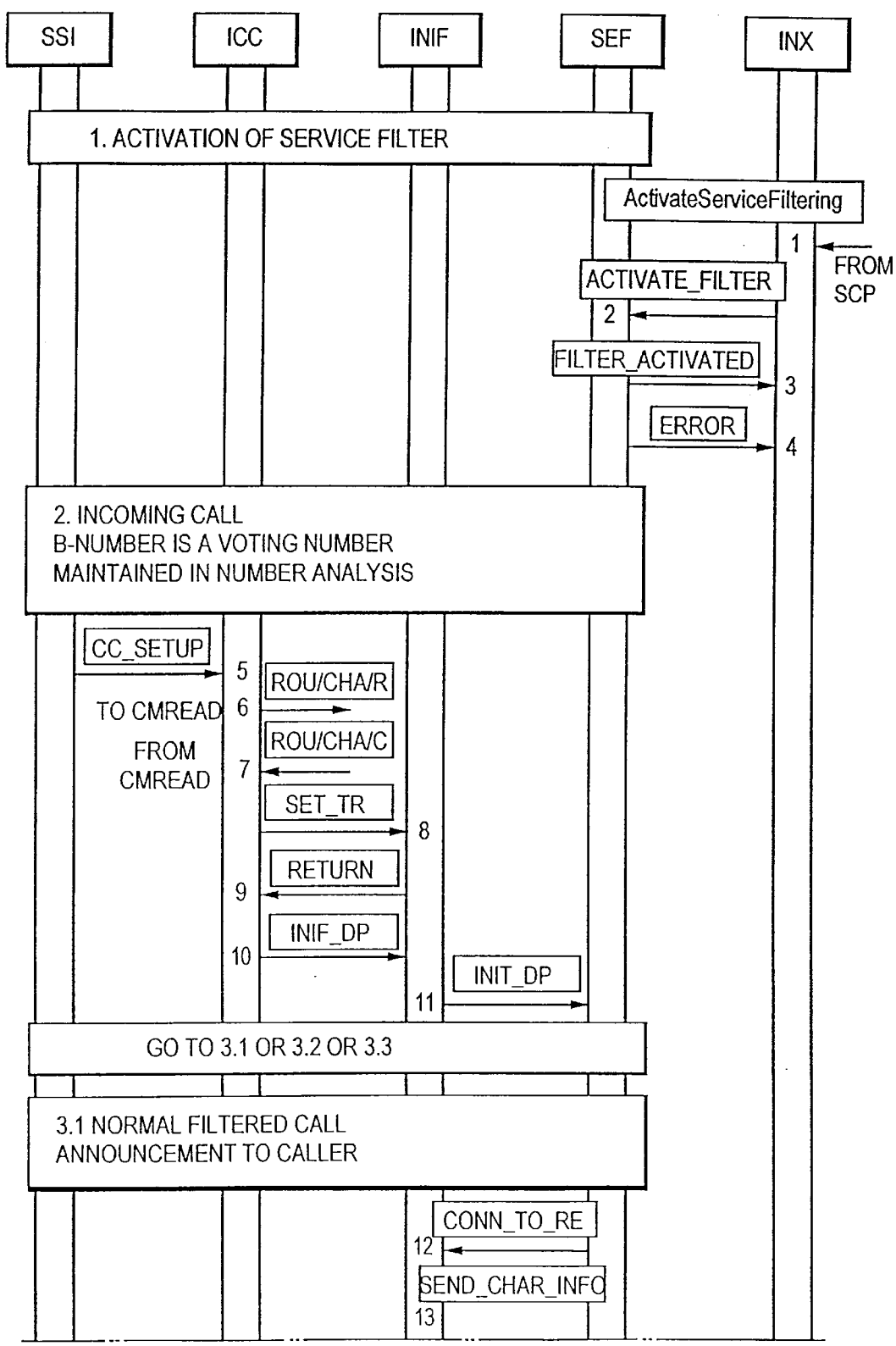

TELEVOTING IN AN INTELLIGENT NETWORK

This application is the national phase of international application PCT/FI96/00202 filed Apr. 12, 1996 which designated the U.S.

BACKGROUND OF THE INVENTION

1. Field of the Invention

The invention relates to a method according to the preamble of attached claim 1 and an arrangement according to the preamble of attached claim 3 for televoting in an intelligent network.

2. Description of Related Art

Fast developments in telecommunications have enabled operators to provide various services for users. Network architecture offering advanced services is called an intelligent network, generally abbreviated IN. IN architecture can be applied to most telecommunication networks, such as Public Switched Telephone Networks PSTN, mobile communication networks, Packet Switched Public Data Networks PSPDN, Integrated Services Digital Networks ISDN and Broadband Integrated Services Digital Networks B-ISDN. Irrespective of the network technology, the object of the intelligent network architecture is to facilitate design, control and management of new teleservices. With regard to present IN specifications, reference is made to Advanced Intelligent Network, Release 1 (AIN Rel.1) by Bellcore and Capability Set 1 (CS-1) by CCITT.

The IN architecture is illustrated by FIG. 1, in which physical entities are presented as rectangles or circles and functional entities as ovals. Signalling connections are indicated by dotted lines, and actual transport, which is e.g. speech, by solid lines. Optional functional entities are indicated by a dotted line. The signalling network shown in the figure is a network according to Signalling System No. 7 (SS7, a known signalling system described in the blue book *Specifications of Signalling System No. 7*, Melbourne 1988 of CCITT (now: ITU-T)).

We shall first describe the architecture of the IN physical level. Subscriber equipment SE, such as a telephone, computer or telefax, is switched either directly to a Service Switching Point SSP or to a Network Access Point NAP.

The service switching point SSP offers the user access to the network and takes care of all the necessary selection activities. The SSP is also able to detect any requests for service in the intelligent network. Operatively, the SSP contains call management and service selection functions.

The network access point NAP is a conventional exchange that contains a Call Control Function CCF and is able to differentiate between conventional calls and calls needing the services provided by the intelligent network and to route the latter to the appropriate SSP, the exchange being e.g. a DX 220 exchange by the applicant.

The Service Control Point SCP contains the service logic programs used for providing intelligent network services.

The Service Data Point SDP is a database containing data on the customer and network, the data being used by the service logic programs of the SCP to provide individualized services. The SCP can use the services of the SDP either directly or through a signalling network.

An Intelligent Peripheral IP provides special-purpose functions, such as notifications and voice and multiple choice detection.

A Service Switching and Control Point SSCP comprises an SCP and an SSP in a single node (i.e. if an SSP node shown in the figure comprises both SCF and SDF entities, it is an SSCP).

The functions of a Service Management Point SMP comprise management of the database (SDP), control and testing of the network, and collection of network information. It can be connected to all other physical entities.

A Service Creation Environment Point SCEP is used for defining, developing and testing the IN services, and for supplying the services to the SMP.

An Adjunct AD corresponds operationally to the service control point SCP but is connected directly to an SSP by a high-speed data link (e.g. ISDN 30B+D connection) and not through a common channel signalling network SS No. 7.

A Service Node SN can control IN services and transfer data to and from the users. It communicates directly with one or more SSPs.

A Service Management Access Point SMAP is a physical entity that provides certain users with a connection to the SMP.

To define the function of the different modules in the intelligent network and the restrictions relating to them, the standards (CS-1) also present the intelligent network as a four-plane Intelligent Network Conceptual Model. One layer of the model forms a so called Distributed Functional Plane DFP, which describes the intelligent network as functional units in accordance with the above CS-1 standard. The following is a description of these functional units whose locations are shown in FIG. 1.

The functions relating to call control are SSF, SRF, CCF and CCAF.

A Service Switching Function SSF interconnects a Call Control Function CCF and a Service Control Function SCF by allowing the service control function SCF to control the call control function CCF.

A Specialized Resources Function SRF provides specialized resources needed for implementing IN services. Examples for these are changes in protocol, speech detection, voice messages, etc.

The call control function CCF refers to conventional call and connection establishment. A Call Control Agent Function CCAF provides the user with access to the network.

The functions relating to service control are SCF and SDF. A Service Control Function SCF comprises the IN service logic and attends to service-bound processing. A Service Data Function SDF provides access to service-bound and network information, and allows consistent checking of information. The SDF hides from the SCF the actual implementation of the information and offers the SCF a logical view of the information.

The functions relating to management are a Service Creation Environment Function SCEF, Service Management Function SMF and Service Management Access Function SMAF. The SMF comprises supervision of management, maintenance and location of the services; the SMAF provides a connection to the SMF; and the SCEF makes it possible to define, develop, test and supply IN services to the SMF.

A request for service made by a calling subscriber typically comprises an act of picking up the receiver and/or a certain series of numbers. The call control function CCF has no service information, but it is programmed to identify the requests for service. The CCF interrupts the call set-up for a moment and informs the service switching function SSF of the state of the call. The function of the SSF is to interpret the request for service and the information on the state of the call, to form a standardized request for service and to send the request to the SCF. The SCF receives the request and decodes it. After this, it forms, encodes and sends a standardized response to the SSF. The formation of a response may comprise encoding of complicated service logic, starting of a Prompt and Collect Sequence, or a request to different SDFS. The SSF decodes and interprets the response sent by the SCF. It then gives the CCF accurate instructions for performing the preparation process. In accordance with the IN standard CS-1, the call control function CCF always bears full responsibility for the condition and control of local links.

When a response is sent to an SSF, the service control function SCF may have to participate in a conversation between a calling user and an end user. This normally takes place in the form of the above prompt and collect sequence, which the SCF authorizes the SRF to perform. Typically, the SCF instructs the SSF to connect the calling user or end user to a suitable physical source by using the SRF. The source may be e.g. a voice message system. The SCF instructs the SRF in the required prompt and collect sequence and subsequently temporarily 'freezes' the call processing. The SRF activates the prompt and collect sequence and participates in the conversation between the calling user and the end user. The response, which may be e.g. an individual ID number, is encoded and returned to the SCF, and the voice connection with the SRF is terminated. After this, the SCF continues its service control sequence.

In the above, the intelligent network is described briefly so as to make the following description of the invention clearer even to a reader who is not so well acquainted with the intelligent network. For more specific details, see e.g. the Q.121X specifications of ITU-T or the AIN specifications of Bellcore.

An intelligent network can offer a large number of different services. The services include e.g. freephone and Account Card Calling ACC, which means that the user can call from any telephone to any number by inserting the number and PIN of his credit card before he inserts the telephone number.

One service offered by the intelligent network is televoting. Televoting is a feature of the intelligent network in which the subscriber can participate in a vote by calling predefined telephone numbers. A voting process is then the act of a subscriber dialling an activated televoting number and the call being registered as a cast vote at the number dialled by the subscriber. Other functions involving the subscriber concerned can also be performed in the same connection. The number is reserved for voting for a single matter/action when the televoting feature is activated. (An activated televoting feature means that the functions enabling the above voting process are provided in the network for a certain period of time.)

Televoting employs a specialized service filter where it is possible to start to count the calls that meet certain predefined criteria. The starting action is performed by the service control function SCF. The service switching function SSF, in turn, counts the calls and sends the number of the filtered calls to the SCF at predefined intervals.

If two or more service control points (or functions) should, independently, reserve the same numbers at the same service switching point (service switching function) for different televotes, the service switching point according to the present standards functions such that the information on the televote that has started earlier is updated by the information on the televote that has started later, whereby the service control point that has started the earlier televote no longer receives reporting information, and the service control point that has started the later televote may also receive information on the calls that were actually intended for the televote that has been started earlier. In the above cases, the system will thus operate incorrectly.

SUMMARY OF THE INVENTION

The object of the present invention is to solve the above problem so as to guarantee faultless continuation of a televote despite the fact that a command is simultaneously received from somewhere else in the intelligent network to start another televote with the same (or some of the same) telephone numbers.

The idea of the invention is to utilize, at a point comprising the service switching function, the address of the function (SCF) that has activated the televoting request and the telephone numbers by checking whether a televote with the same or some of the same telephone numbers has already been started from some other address. If so, the service switching point will reject the voting request.

BRIEF DESCRIPTION OF THE DRAWINGS

In the following the invention and its preferred embodiments will be described in greater detail by the examples illustrated by the attached drawings with reference to FIGS. 2 to 6, in which FIG. 5 illustrates the relationship between FIGS. 5a and 5b.

FIGS. 5a and 5b illustrate the process of televoting and the signalling involved in it.

DETAILED DESCRIPTION OF THE PREFERRED EMBODIMENTS

Figure 1:
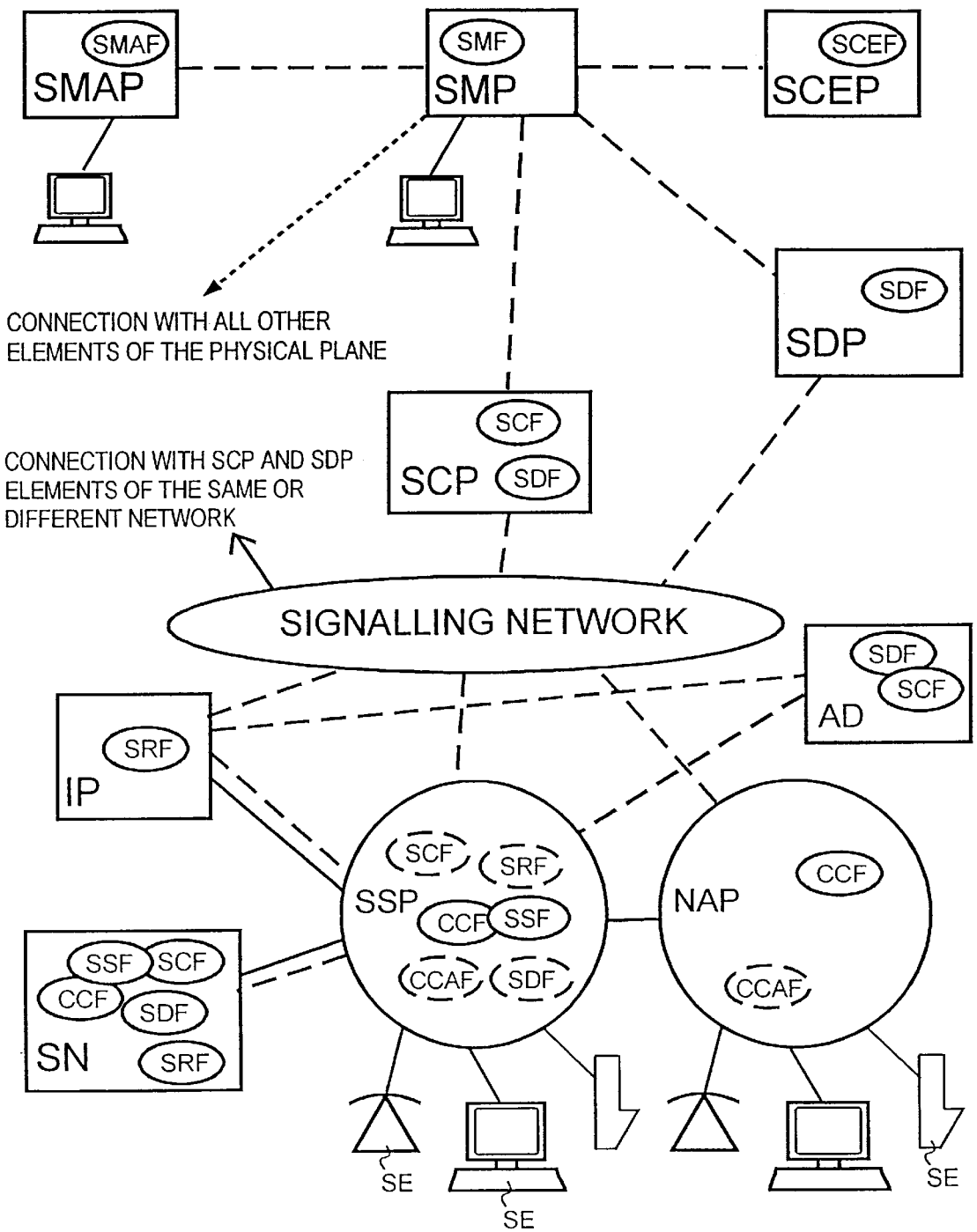
FIG. 1 illustrates the architecture of an intelligent network.
Figure 2:
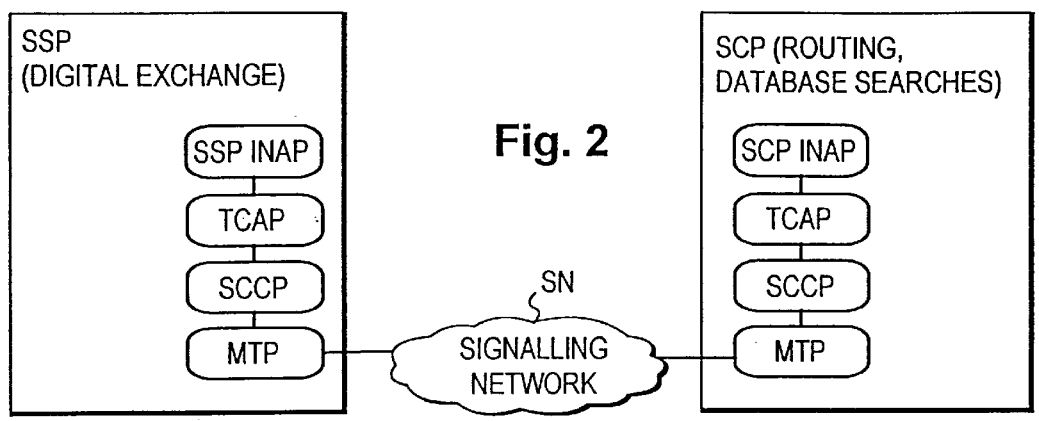
FIG. 2 illustrates signalling between a service switching point and a service control point in an intelligent network.

As stated above, a televote is activated at a point (usually an SCP) comprising the service control function SCF, and the calls are counted at a point (usually an SSP) comprising the service switching function SSF. The SSP and SCP are interconnected by a signalling network SN according to the signalling system no. 7 in the manner shown in FIG. 2. In mutual communication, the SSP and SCP usually employ an Intelligent Network Application Protocol INAP, which is described in ETSI IN CS1 INAP Part 1: Protocol Specification, Draft prETS 300 374-1, November 1993 by European Telecommunications Standard Institute ETSI. (Where mobile telephone traffic is concerned, the INAP layer is replaced with a MAP layer, Mobile Application Part.) In an SS7 protocol pile, which is also illustrated in FIG. 2, the INAP layer is the uppermost layer, having beneath it a TCAP layer (Transaction Capabilities Application Part), an SCCP layer (Signalling Connection Control Point) and an MTP layer (Message Transfer Part). During a call made in an intelligent network, there may be one or more INAP dialogs between the SSP and the SCP. Each of these dialogs begins with a predefined initial detection point message (hereinafter: INIT_DP).

Figure 3:
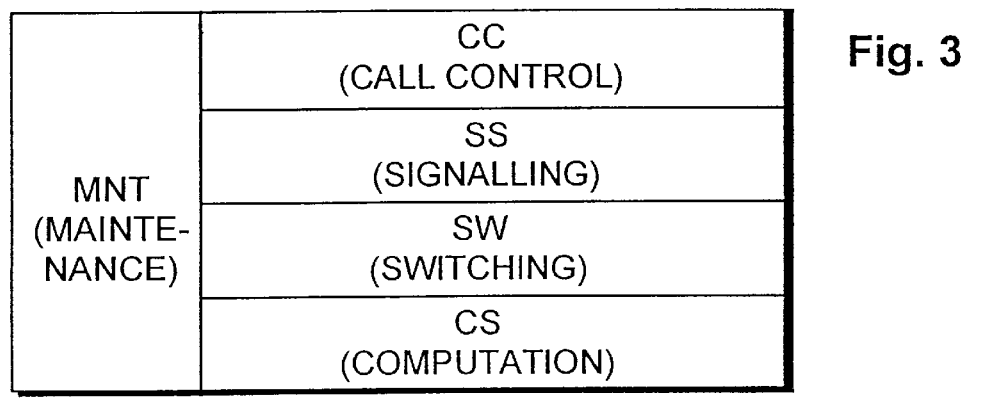
FIG. 3 illustrates the basic functions of an exchange.

The service switching point SSP is typically a digital exchange in which the intelligent network functions are arranged by modifying conventional call control software. Every modern exchange like this has the same basic functions, which can be grouped in accordance with FIG. 3 e.g. as follows:

1. call control functions CC, including e.g. functions for setting up, maintaining and releasing a call,
2. signalling functions SS, which e.g. match the different signalling systems with the internal functions of the exchange,
3. switching functions SW, which attend to call switching,
4. functions MNT for maintaining the network and exchange system, and
5. various computer-based functions CS requiring computation, also including data management, file services and telecommunication software of the exchange.

Figure 4:
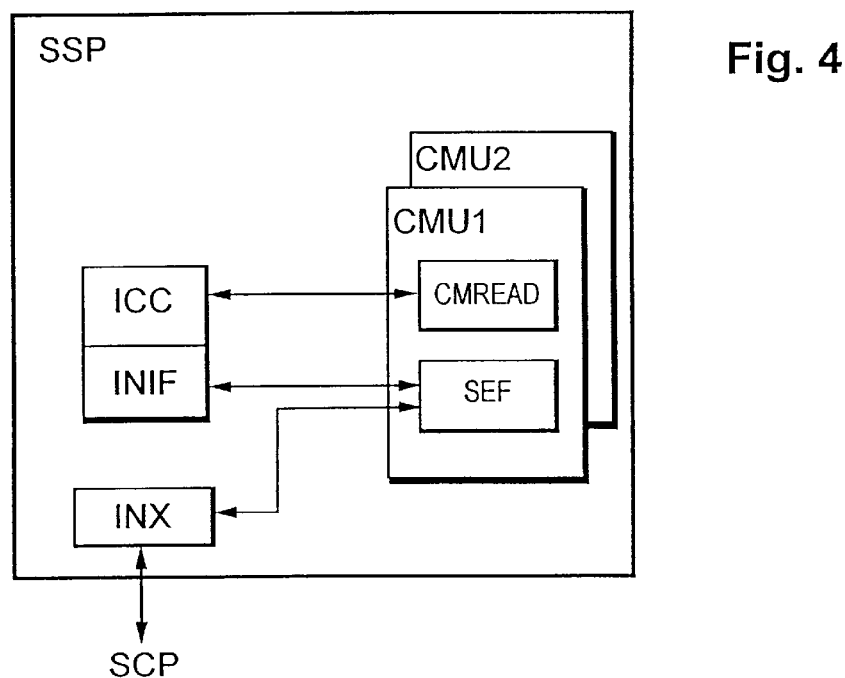
FIG. 4 illustrates the operating environment of a service filter used in a televote at a service switching point of an intelligent network.

A service filter counting the incoming calls of a televote belongs to item 5 above. FIG. 4 illustrates the service environment of a service filter SEF at a service switching point SSP (or at a point of the intelligent network comprising the corresponding function SCF) by presenting the operational (program) blocks that are involved in televoting. The service filter SEF itself is implemented in the main storage of a computer unit marked with CMU1, the storage also comprising a charging and bus analyses service program block CMREAD, which communicates with an incoming call control block ICC. The interface between the intelligent network functions and the call control is indicated by INIF, and the block that provides an interface toward the service control point at the service switching point is indicated by INX. Interface block INX functions in the above INAP layer.

The blocks (CMREAD and SEF) in the computer unit CMU1 belong to item 5 of the above list of functions of the exchange, the interface blocks INIF and INX belong to signalling functions SS, and the control block ICC naturally belongs to item 1 (call control). The figure also shows another computer unit CMU2, which may be e.g. a back-up unit for the first unit CMU1.

The charging of the calls routed to the service filter SEF is controlled by the dialled numbers (in a manner known per se). Different messages may be sent to a user participating in a televote or the call may be routed further under control of the SCP.

The management, control and use of a service filter block SEF take place, in their entirety, via the message interfaces INX and INIF shown in the figure. Interface INX is used both for transmitting information on the service filtering from the SCP to the service filter and for transmitting the reporting information of the service filter back to the SCP. The call control interface INIF is used for transmitting information on the call counting (voting process) to the call control ICC. For each separate activated televoting process, the service filter SEF has different, independent and separate functions attending to the televoting concerned (the program blocks concerned are copied separately for each activated televoting process). (The act of providing services, i.e. activating a televote, is described in greater detail below.) The service filter SEF registers an incoming call by adding to the reading of the corresponding call counter and sends interface INIF a corresponding charging, announcement and release notification caused by the call. If the call is routed further, the service filter retrieves routing information from the SCP via application interface INX and returns it to interface INIF.

Figure 5B:
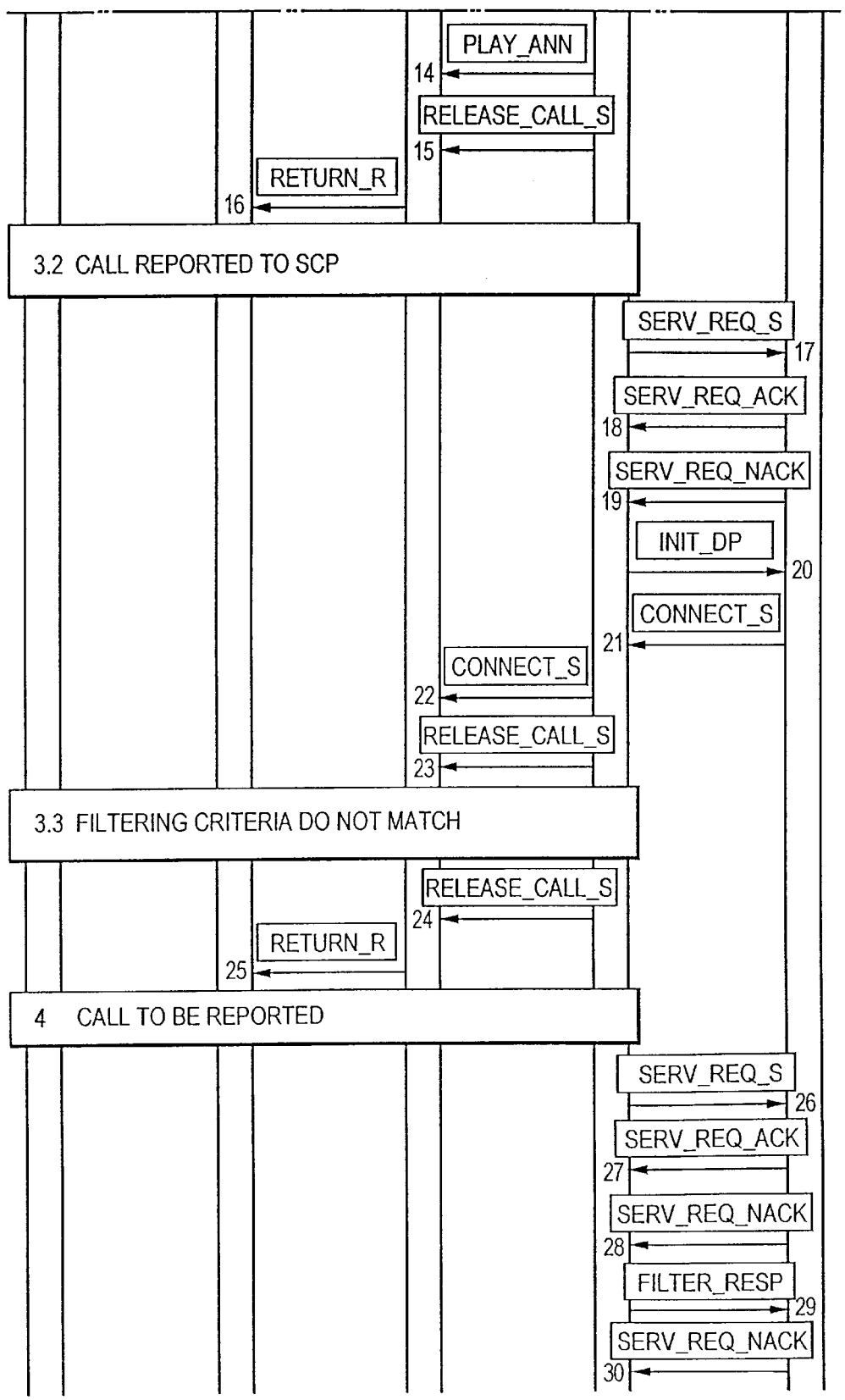

The following is a more detailed description of a televoting process. Reference is made to FIG. 5 (which is divided into FIGS. 5a and 5b).

The service switching point SSP has a certain number space (defined by the operator) reserved for televoting processes (e.g. from number 9700-1111 to number 9700-2222). A televoting process is activated as follows (cf. item 1 in FIG. 5a). The signalling block SSI shown in FIG. 5 takes care of signalling (in this case, signalling on the input side) with respect to the telephone network, i.e. signalling from the other exchanges and subscribers. An example is a televoting process for which the SCP reserves nine consecutive numbers, starting from 9700-1111 and terminating in 9700-1119.

The activation is started by an 'Activate-ServiceFiltering' request sent by the SCP to interface INX. The request is an INAP message defined in the standards. On the basis of the information included in the message, interface block INX sends the service filter an activation request ACTIVATE_FILTER. The service filter then activates the functions needed for the televoting concerned. If the activation is successful, the service filter sends a message FILTER_ACTIVATED, which indicates the success. If the call counting function fails to be started, the service filter sends a message ERROR indicating a failure and also containing the reason for the failed activation.

Televoting is thus activated in the above manner. We shall now move on to study the actual televoting process.

When a service switching point (SSP) receives a call initiating message (e.g. a known IAI message, which is the initiating message of a normal TUP call), the initiating message is converted in the signalling part into a message CC_SETUP, which is sent to a call control part ICC, which asks the service block CMREAD to perform a charging and route analysis concerning the call by sending a corresponding request (ROU/CHA/R). As a result of the analysis, the call control block ICC receives a trigger (ROU/CHA/C) from block CMREAD and sends a message SET_TR concerning the trigger to block INIF. In the information of the trigger, the call is defined to be supplied to a service filter SEF for processing. Interface block INIF then informs the call control of a successful trigger (message 9, RETURN), and sends the service filter SEF a message INIT_DP, which is the initiating message of the above INAP dialogue and contains information on the dialled telephone number (B-number). After this, one proceeds to item 3.1, 3.2 or 3.3, depending on the call and the situation.

One proceeds to item 3.1 in a normal situation where the B-number belongs to an activated televoting process (in this example the number is thus between 9700-1111 and 9700-1119) and the other criteria (e.g. A-number) are also acceptable. The service filter thus registers an incoming call by adding to the reading of the corresponding call counter and sends interface block INIF a message CONN_TO_RE so as to start an information service (e.g. to give the calling party a voice message). In addition, the service filter SEF sends a charging, announcement and call release notification to block INIF (SEND_CHAR_INFO). After this, the service filter gives interface block INIF a command (PLAY_ANN) to give the voice message, audible tone or text message defined in connection with activating the televoting process (the subscriber that has called to a televoting number is notified that he is participating in a televote concerning a specified matter). After the notification, the service filter SEF releases the call by sending a release message RELEASE_CALL_S. The release command is forwarded as a message RETURN_R to a call control block. When an error occurs, the release message also contains an error code, which indicates the reason for the error.

Item 3.2 relates to an additional feature by which certain calls can be processed differently from the other calls by requesting the SCP for additional instructions for processing these calls. A feature like this can be used e.g. when one wants to reward some of the calling parties for participating in a televote. For example, it is possible to ask the SCP for further instructions at every thousandth call, the SCP then giving e.g. instructions to forward the call e.g. to a TV studio if the televote takes place in a direct TV show. When a televoting process is activated, it is possible to define when and at what calls further instructions will be requested from the SCP.

When a call meets the above conditions (one moves from item 2 to item 3.2), the service filter registers the call by allowing the corresponding call counter to step and sends a service initiating request SERV_REQ_S to block INX, which acknowledges a successful initiation by a response SERV_REQ_ACK. If the initiation fails, the INX acknowledges by a message SERV_REQ_NACK. As a result of a successful initiation, the service filter forwards an initiating message INIT_DP (message 11 above) received from the interface block to the SCP via block INX. Interface block INX sends the acknowledgement (CONNECT_S) received from the SCP back to the service filter, which forwards it to interface block INIF. From then on, the call will be processed in accordance with the instructions given by the SCP. As a result of a failed initiation, the service filter releases the call by a message RELEASE_CALL_S, which also indicates the reason for the failure.

If, on the other hand, an incoming call is such that not all information relating thereto is in line with the filtering criteria, one moves from item 2 directly to item 3.3. Such a situation is e.g. a situation where the calling number (A-number) is not within the allowed area (e.g. only subscribers in a certain geographical area, e.g. a certain town, may participate in the televote). Here the service filter releases the call e.g. by the above release message RELEASE_CALL_S.

At certain intervals, the service filter reports the televoting situation to the SCP. Reporting is preferably performed simultaneously when the call is a call belonging to item 3.2, since the service control point SCP will then be contacted in any case.

Item 4 of FIG. 5b relates to the above-mentioned forwarding of the results to the SCP. The service filter starts the reporting by sending a service initiating request SERV_REQ_S to block INX, which as a result of a successful initiation sends an acknowledgement SERV_REQ_ACK. When the initiation fails, the INX acknowledges by a message SERV_REQ_NACK, which is provided with an error code. When the initiation fails, the service filter SEF continues to count the calls quite normally without re-setting the counters to zero. After a successful initiation, the service filter sends interface block INX statistical data in the next message FILTER_RESP in accordance with the instructions given during the activation, the INX forwarding them to the SCP by a 'ServiceFiltering-Response' notification defined in the standards. Block INX sends the service filter an acknowledgement ABORT, which indicates the success/failure of the process of compiling statistics. After sending an intermediate report and receiving an acknowledgement of a success, the service filter SEF re-sets the counters counting the calls and re-starts the counting of the calls from zero. After sending a final report, the call counting feature is terminated and the call counting is considered to have come to an end.

In FIGS. 5a and 5b, the above messages are also indicated by numbers. The following is a list of the meanings of the messages, some of which have been mentioned earlier.

1. An activation request from an SCP to start service filtering for certain calls in accordance with the given criteria.
2. Activate service filtering.
3. Service filtering successfully activated for the calls meeting the given criteria.
4. Activation of service filtering for the calls meeting the given criteria has failed.
5. A message for initiating a call coming from a televoter.
6. Performance of routing and charging analysis.
7. Number analysis provides a route to an intelligent network. The result of the analysis contains a trigger that is forwarded by the call control block to interface block INIF.
8. Interface block INIF stores the trigger if it has been activated.
9. Trigger has been successfully set. The call control block ICC is at the detection point 'Analyze_info' of the basic call state model defined by the standards. At that point, the initiating data is received from the calling party and the information is analyzed to identify the routing address and the call type. (The detection point is a phase of the basic call control in which an event relating to call processing can be announced to the service control function SCF.)
10. Interface block INIF checks the trigger and detects that the conditions are met.
11. Use of the services provided by the intelligent network is started. The service filter SEF checks the filtering criteria (as a result of which one proceeds to item 3.1, 3.2 or 3.3.).
12. The SRF is reserved for giving a notification or the like to a calling subscriber.
13. Charging of the call.
14. Notification given to the calling subscriber.
15. and 16. Call released.
17. Service filter requests interface block INX for service.
18. Service granted.
19. Service denied.
20. Instructions requested from the SCP to terminate the call.
21. and 22. Call forwarded from the SCP in accordance with the instructions given.
23. Call disconnected. Message contains a cause code determined by the SCF.
24. and 25. Call released.
26. Service requested from interface block INX.
27. Service granted.
28. Service denied.
29. Voting result announced to the SCP.
30. Information on whether the voting result has been received correctly.

Figure 6:
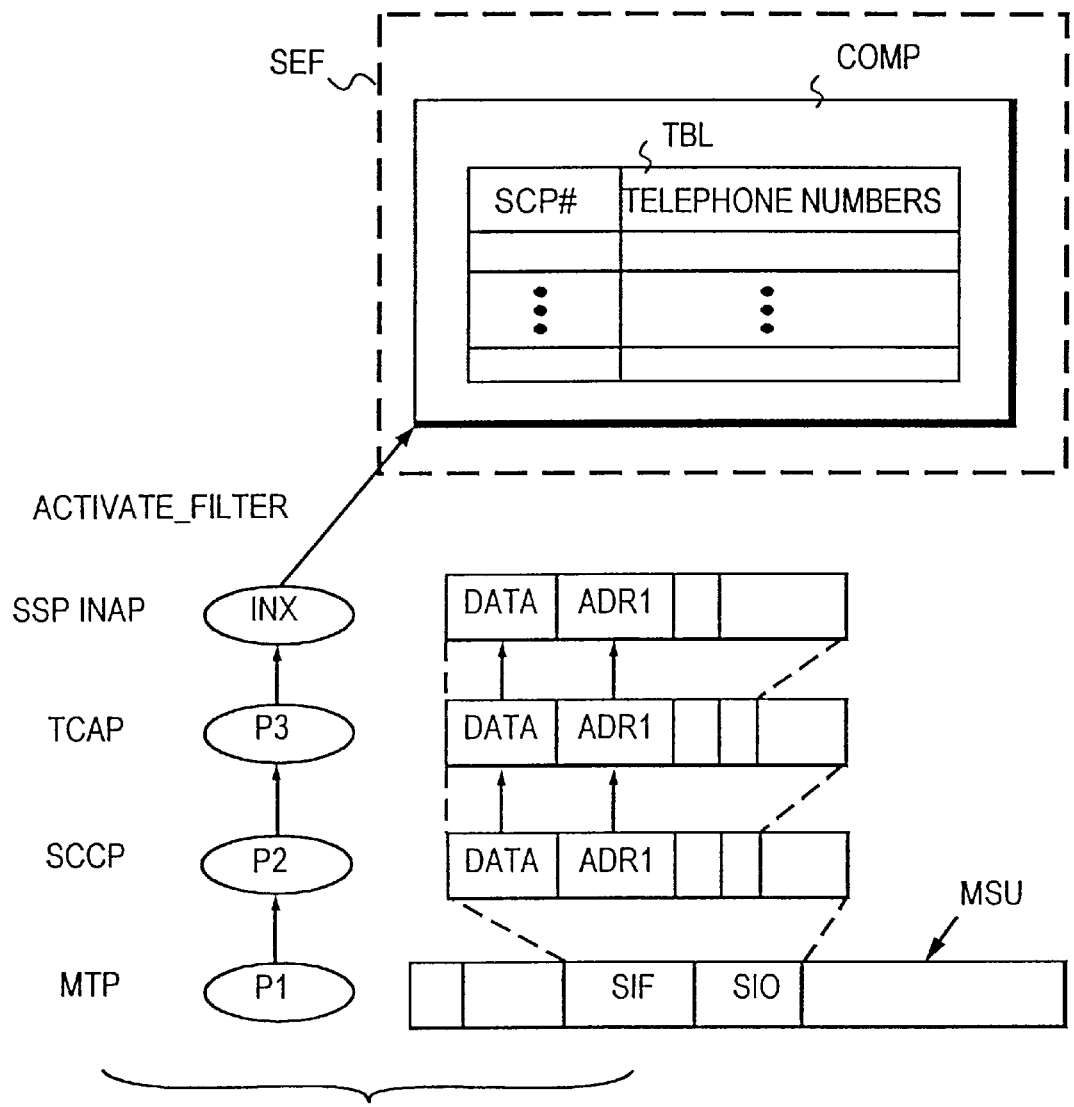
FIG. 6 illustrates transmission of information needed in a comparison according to the invention to a service filter.

After receiving an activation request ACTIVATE_FILTER (which contains information e.g. on the telephone numbers used in the voting and on the address of the SCP that has sent the activation message), the service filter SEF makes comparisons to find out whether some other SCP has already started a voting process with the same or some of the same numbers. The service block thus contains a separate comparison block, which in FIG. 6 is indicated by COMP and to which is connected a table TBL stored in the memory, the table containing the addresses of the service control points (SCP) that have initiated televoting processes that are now active and the telephone numbers used in each voting process.

For the comparison, e.g. the address of the calling SCP will have to be transmitted to the service filter. FIG. 6 also illustrates the transmission of the address and of other data to the service filter. Each layer has its own process (the MTP layer has P1, the SCCP layer has P2, the TCAP layer has P3, and the INAP layer has block INX) that attends to transmitting messages. The Message Signal Unit MSU of the MTP layer comprises e.g. a Signalling Information Field SIF and a Service Information Octet SIO, which are forwarded to the SCCP message and which contain e.g. the address of the calling SCP, which is indicated by ADR1. The address of the calling SCP is thus obtained normally as far as the SCCP layer, but the address of the calling SCP no longer appears e.g. from the messages of the INAP layer. Because of this, in addition to actual data, the address must also be transmitted upward in the pile of protocols up to the INAP layer. The above activation message ACTIVATE_FILTER is transmitted from the INAP layer to the service filter. The activation message contains e.g. the following fields:

Address of SCP

The address of the SCP that has transmitted the activation message. The address helps the service filter to check that another SCP cannot create a new vote for the same (or some of the same) series of numbers as the first SCP. This can be implemented e.g. in the above manner by maintaining a table of the type described in FIG. 7 in the service filter, the table containing, for each activated televoting process, the address and voting numbers of the SCP that has requested the vote.

Processing of Filtered Call

Functions relating to call control and charging. The field contains e.g. information on what announcement should be given to the caller.

Maximum Number of Counters

The field indicates the number (e.g. 20) of counters to be reserved for a televoting process. If the voting number is e.g. 9700-1234 and the number of counters is 20, it means that the telephone numbers are 9700-1234, 9700-1235, 9700-1236, ..., 9700-1253.

Filtering Mode

Information controlling the operation of the service filter. Either 'time slot' or 'number of calls' is used. When 'time slot' is 0, then all the calls are re-routed and a report is transmitted. When it is −1, the calls are not re-routed and no report is sent. The other values are treated as seconds (in the same way as with value 0). The 'number of calls' indicates which call participating in a televote causes re-routing of the call and transmission of a reporting message. When the value is 0, calls are not forwarded and no (intermediate) reports are transmitted.

Period of Televoting

Information indicating the period when a televote is valid (given e.g. in seconds).

Terminating Time

The time when a televote is terminated. If the terminating time is earlier than the present time, a report message will be sent and the televote terminated.

Filtering Criteria

Registration criteria for the calls routed to a televote or to be registered in a televote.

Voting Number

The televoting number—in its entirety—from which the voting numbers begin.

Starting Time

The time when a televote is started. If the time is earlier than the present time or if it has not been set at all, the televote will be started immediately. Otherwise, the vote will be started at the defined time.

If the service filter detects that the calling SCP requests for a televote with one or more numbers that are already reserved for a televote started by another SCP, it rejects the latter voting request (i.e. will not start it) and includes a reason for the failed activation in a message indicating the failure (message 4, ERROR). The information can be forwarded e.g. as an error code 'TaskRefused' in the data field 'ERRORS' defined in the INAP standards, the value of the code meaning congestion. After receiving the error code, the SCP knows that televoting is not possible.

It is also possible that the SSP sends the SCP a separate error message on the basis of which the SCP knows how it should change the numbers selected to make televoting possible. The error message may then contain e.g. information on the first free number.

If the service switching point detects that a televoting process is requested by a service control point that has already activated a televoting process, the televoting data are changed in the same way as a televote is activated. In other words, televoting continues in accordance with the new parameters.

Although the invention is described above with reference to the examples of the attached drawings, it is to be understood that the invention is not limited thereto but can be varied within the scope of the inventive idea defined above and in the attached claims. Since the actual invention relates to comparison of SCP addresses, televoting can be varied in many ways without deviating from the spirit of the invention. For example, intermediate reports of the results are not always necessary but reporting of the final results may suffice.

I claim as my invention:

1. A method for televoting in an intelligent network, comprising:

sending a televoting activation request from a first point comprising a service control function to a second point comprising a service switching function;

counting, by the second point, calls made by network users to predetermined telephone numbers;

transmitting information on a number of calls to the first point in the intelligent network;

comparing, when the second point receives a televoting activation request from the first point, to determine whether a televoting process, which is activated by a service control point and which uses at least some same numbers of a telephone number of the televoting activation request, is in progress, and if the televoting process is in progress, the second point not starting a televoting process.

2. The method according to claim 1, further comprising:

sending an error message from the second point to the first point when the second point detects, after receiving the televoting activation request, that the televoting process, which is activated by the service control point and which uses the at least some same numbers of the telephone number of the televoting activation request, is in progress.

3. The method according to claim 2, wherein the error message substantially conforms to ITU-T recommendations Q.1210 to Q.1219.

4. An arrangement for televoting in an intelligent network, comprising:

a first point; and
a second point, wherein:
the first point comprises:
a service control function, and
a televoting activation request sender to send a televoting activation request to the second point; and
the second point comprises:

a service switching function, a call counter to count calls made by network users to predetermined telephone numbers, a call information sender to send information on a number of calls to the first point, and an activation comparer to determine, in response to receiving the televoting activation request, whether a televoting process, which is activated by a service control point and which uses at least some same numbers of a telephone number of the televoting activation request, is in progress.

5. The arrangement according to claim 4, wherein the second point is arranged to send an error message when the second point detects, after receiving the televoting activation request, that the televoting process, which is activated by the service control point and which uses the at least some same numbers of the telephone number of the televoting activation request, is in progress.

6. The arrangement according to claim 5, wherein the error message substantially conforms to ITU-T recommendations Q.1210 to Q.1219.

* * * * *